(12) United States Patent
Wolf et al.

(10) Patent No.: US 10,601,270 B2
(45) Date of Patent: Mar. 24, 2020

(54) ROTOR OF AN ELECTRIC MACHINE WITH A LAMINATED CORE

(71) Applicant: ZF FRIEDRICHSHAFEN AG, Friedrichshafen (DE)

(72) Inventors: Walter Wolf, Werneck (DE); Hubertus Büttner, Bad Kissingen (DE); Christian Kirchner, Wargolshausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/303,031

(22) PCT Filed: Apr. 18, 2017

(86) PCT No.: PCT/EP2017/059088
§ 371 (c)(1),
(2) Date: Nov. 19, 2018

(87) PCT Pub. No.: WO2017/198406
PCT Pub. Date: Nov. 23, 2017

(65) Prior Publication Data
US 2019/0207444 A1  Jul. 4, 2019

(30) Foreign Application Priority Data
May 20, 2016  (DE) .................. 10 2016 208 692

(51) Int. Cl.
*H02K 21/12* (2006.01)
*H02K 1/27* (2006.01)
*H02K 1/28* (2006.01)

(52) U.S. Cl.
CPC ............. *H02K 1/276* (2013.01); *H02K 1/28* (2013.01)

(58) Field of Classification Search
CPC ............ H02K 1/276; H02K 1/28; H02K 1/27; H02K 1/30
See application file for complete search history.

(56) References Cited

U.S. PATENT DOCUMENTS 5,704,111 A * 1/1998 Johnson .................. H02K 1/30
29/451
6,408,502 B1 * 6/2002 Brahmavar ............ H02K 1/278
29/596

(Continued)

FOREIGN PATENT DOCUMENTS

AT     10 720       8/2009
DE     38 81 865    11/1993
(Continued)

*Primary Examiner* — Thanh Lam
(74) *Attorney, Agent, or Firm* — Cozen O'Connor

(57) ABSTRACT

A rotor having a lamination stack including a first partial stack with first sheet metal laminations and a second partial stack with second sheet metal laminations. The laminations and partial stacks are joined axially along a center axis of the lamination stack. Each partial stack has a radially inner circumferential area and a radially outer circumferential area and a plurality of connection areas distributed in circumferential direction in mutual register at the joined partial stacks and form a common connection area. At least one of the partial stacks includes a fastening area for arranging the lamination stack at a carrier element. The lamination stack has a magnetic interaction area formed by one of the circumferential areas of the partial stacks for cooperation with a stator. The magnetic interaction area has a plurality of rotor poles with permanent magnets, which are uniformly distributed along the circumference.

9 Claims, 4 Drawing Sheets

(56) References Cited

U.S. PATENT DOCUMENTS

| | | | | |
|---|---|---|---|---|
| 8,633,630 B2* | 1/2014 | Pan | ................. | H02K 1/30 |
| | | | | 310/156.12 |
| 8,829,758 B2* | 9/2014 | Takizawa | ............. | H02K 1/2773 |
| | | | | 310/156.48 |
| 2007/0222326 A1 | 9/2007 | Ionel et al. | | |
| 2012/0248918 A1 | 10/2012 | Itou et al. | | |
| 2013/0221789 A1* | 8/2013 | Atkinson | ............... | H02K 1/276 |
| | | | | 310/156.67 |
| 2015/0222153 A1* | 8/2015 | Lange | .................... | H02K 1/276 |
| | | | | 310/51 |

FOREIGN PATENT DOCUMENTS

| | | |
|---|---|---|
| DE | 11 2007 002887 | 9/2009 |
| DE | 10 2009 017850 | 10/2010 |
| EP | 1 175 561 | 1/2002 |
| EP | 1 816 730 | 8/2007 |

* cited by examiner

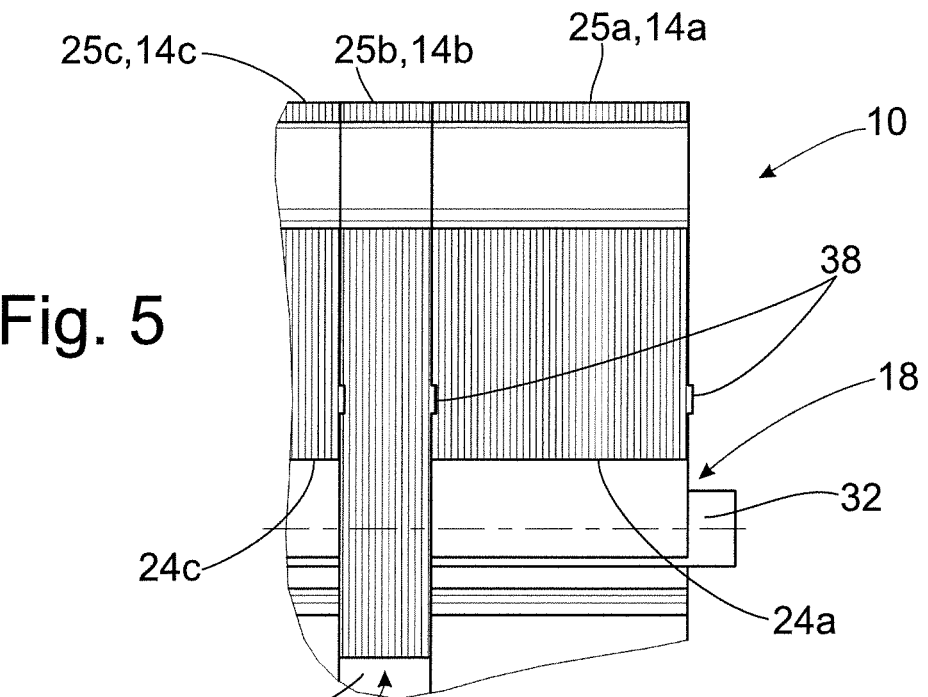
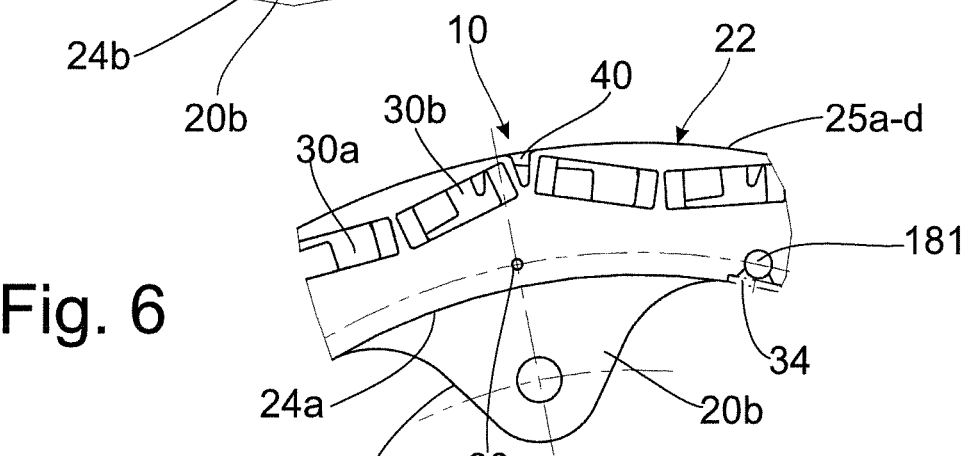
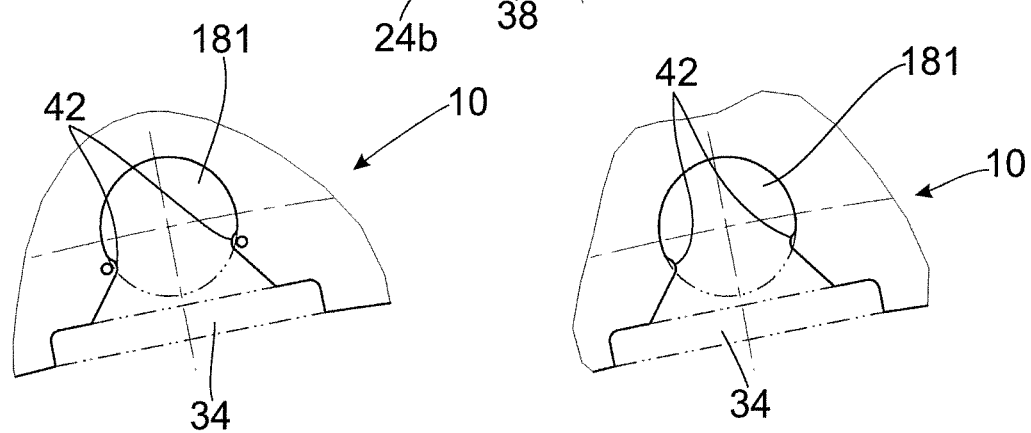

ROTOR OF AN ELECTRIC MACHINE WITH A LAMINATED CORE

CROSS REFERENCE TO RELATED APPLICATIONS

This is a U.S. national stage of application No. PCT/EP2017/059088, filed on Apr. 18, 2017. Priority is claimed on German Application No. DE102016208692.8, filed May 20, 2016, the content of which is incorporated here by reference.

BACKGROUND OF THE INVENTION

1. Field of the Invention

The invention is directed to a rotor of an electric machine having a lamination stack.

2. Description of the Prior Art

A generic rotor of this type which, in particular, carries a rotor winding at a magnetic interaction area facing the stator, is known from EP 1 175 561 B 1.

SUMMARY OF THE INVENTION

An object of one aspect of the invention to improve a rotor of this kind, which is met through a rotor of an electric machine having a lamination stack.

A rotor of an electric machine having a lamination stack is suggested. This rotor comprises a first partial stack with first sheet metal laminations and a second partial stack with second sheet metal laminations, and the sheet metal laminations and partial stacks are joined axially along a center axis of the lamination stack. Each of the partial stacks has a radially inner circumferential area and a radially outer circumferential area and a plurality of connection areas which are distributed in circumferential direction and which are in mutual register at the joined partial stacks and accordingly form a common connection area. Further, at least one of the partial stacks comprises a fastening area for arranging the lamination stack at a carrier element, and a circumferential area is formed so as to be radially offset to a circumferential area of an axially adjacent partial stack in order to form this fastening area. The lamination stack has a magnetic interaction area formed by one of the circumferential areas of the partial stacks for cooperation with a stator of an electric machine. The rotor is characterized in that the magnetic interaction area comprises a plurality of rotor poles with permanent magnets that are uniformly distributed along the circumference.

Accordingly, there is provided a rotor for a permanently excited electric machine in which a fastening area for fastening to a carrier element is not formed on all of the partial stacks but rather, in particular, is provided at only one of the partial stacks. In this regard, a magnetic interaction area of the lamination stack is provided at the circumferential area located at a distance from the connection areas. A desired unimpeded propagation of a rotor magnetic field inside of the lamination stack can be achieved in that the at least one fastening area is formed at the same inner circumferential area or outer circumferential area as the connection areas. In this regard, the fastening areas and the connection areas can be formed at the lamination stack to be radially staggered relative to one another. Particularly in a rotor of an inrunner machine, the fastening areas are provided as lugs and can be arranged at the lamination stack so as to be offset radially inward relative to the connection areas. In principle, a connection area for connecting sheet metal laminations and partial stacks can be constructed in a variety of ways. For example, the connection area can be realized by means of in-die stacking or can have a connection pin that is screwed in or riveted or a weld which is carried out by itself at the lamination stack or together with a connection pin.

According to a first advantageous configuration of the invention, a partial stack can have pockets for receiving the permanent magnets in the interaction area, each rotor pole comprising two permanent magnets which are adjacent in circumferential direction and arranged together or separately in the pockets. The permanent magnets can be formed in an integral or segmented manner. In particular, the rotor can have, for example, a total of 16 rotor poles, or an integral multiple thereof, and 32 permanent magnets or the integral multiple thereof. The pockets can be constructed so as to be radially open or closed. Pockets of two adjacent rotor poles, which pockets are adjacent in circumferential direction, can preferably be separated by a gap.

According to another favorable configuration, a plurality of fastening areas are arranged in circumferential direction between the connection areas, preferably symmetrically with respect to the latter, are formed at a partial stack.

When there are 16 rotor poles, the connection areas as well as the fastening areas can be arranged to be offset relative to one another by 45° at the circumference in each instance.

At the same time, the sum of the quantity of connection areas and the quantity of fastening areas at a partial stack can correspond to the quantity of rotor poles.

In a particularly advantageous manner, the connection areas can be arranged at a partial stack asymmetrically with respect to the rotor poles, and the connection areas include an angle $\alpha$ relative to a plane of symmetry of the rotor poles in a lateral plane of the lamination stack. Accordingly, by axially joining two mirror-inverted partial stacks, the rotor poles of these two axially adjacent partial stacks can be arranged so as to be offset relative to one another by an angle $2\alpha$ in circumferential direction. The advantage herein consists in a noticeable reduction in the magnetic cogging torque of an electric machine of this type.

In order to achieve high strength and durability, it is further advantageous that a connection area can have a cutout that extends axially within the sheet metal laminations and in which a profile bar extending axially over both partial stacks and being made from a weldable material, for example, a steel, is inserted and is welded to the sheet metal laminations. For captive holding of the profile bar during manufacture, the edge area of a recess can have at least one projection for interacting with the profile bar in a frictionally engaging manner such that the latter can be clamped or pressed into it.

Further, an axially extending free space can be formed such that articles to be welded can be held radially between the profile bar and a nearest circumferential area of the lamination stack. Further, when appropriately dimensioned, this free space can form a cooling channel for conducting a cooling fluid so as to cool the rotor also particularly on the radial side remote of the magnetic interaction area.

BRIEF DESCRIPTION OF THE DRAWINGS

The invention will be described in the following by way of example with reference to an embodiment form shown in the figures.

The drawings show:

FIG. 5 is an enlarged axial partial view of the lamination stack with a fastening area;

FIG. 6 is an enlarged front partial view of the lamination stack from FIG. 5;

FIG. 7 is an enlarged front partial view of the lamination stack with a connection area; and FIG. 8 is an enlarged front partial view of the lamination stack with a connection area constructed alternatively relative to FIG. 7.

DETAILED DESCRIPTION OF THE PRESENTLY PREFERRED EMBODIMENTS

Figure 1:
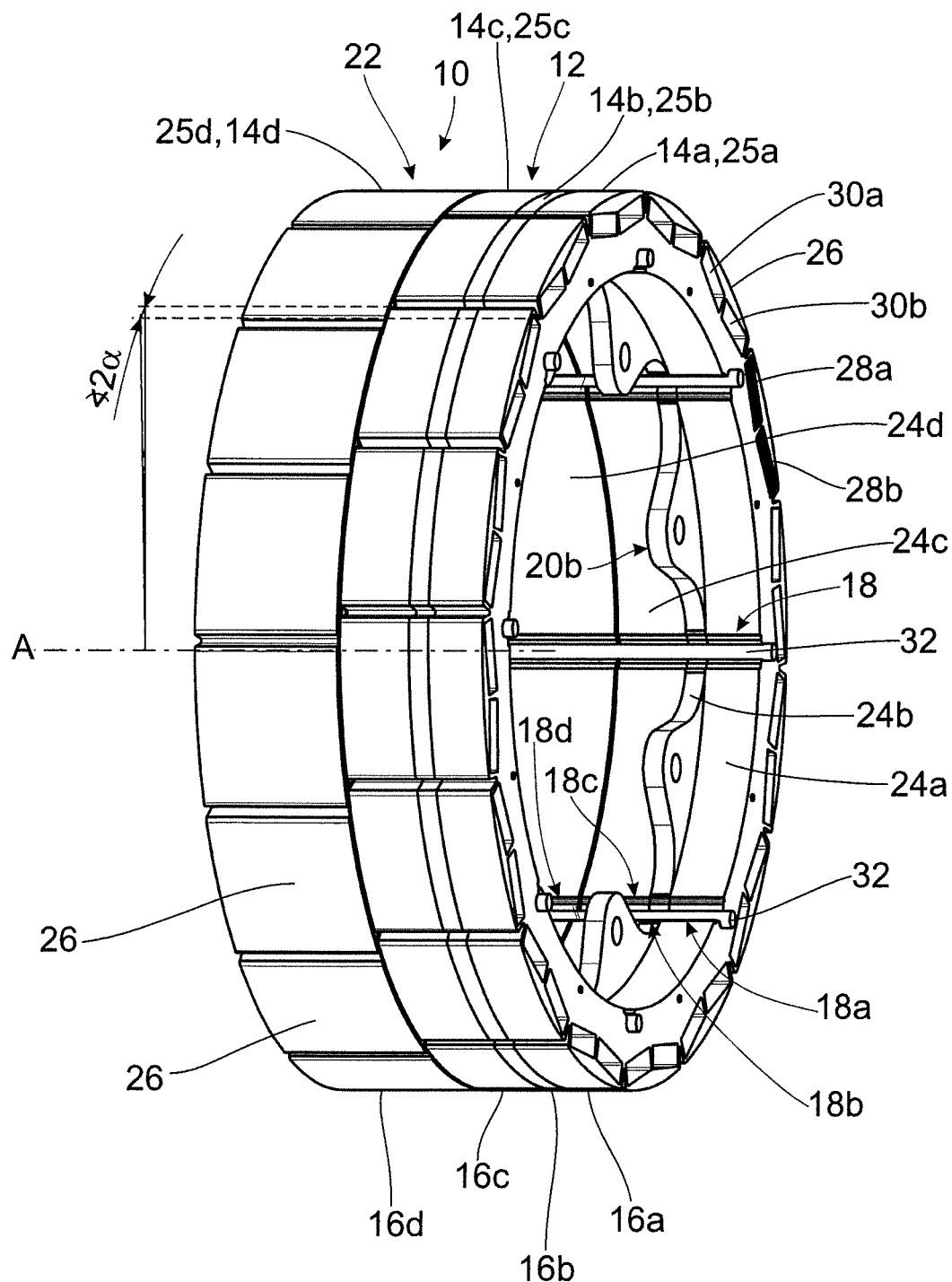
FIG. 1 is a perspective view of a rotor of an electric machine with a lamination stack, which comprises a plurality of axially staggered partial stacks.

Like subject matter, functional units or comparable components are designated by like reference characters throughout the figures. Further, summarizing reference characters are used for components and objects that occur more than once in an embodiment example or in a diagram but which are collectively described with respect to one or several features. Components or objects which are designated by like or summarizing reference characters may be implemented alike but also differently with respect to individual, several or all features such as, e.g., dimensioning, insofar as the description does not implicitly or explicitly indicate otherwise. Identical subject matter, functional units and comparable components in various embodiment examples are not described repeatedly so as to avoid repetition, and only the differences between the embodiment examples are described.

The figures show a rotor 10 of an inrunner-type electric machine, not shown more fully in the drawings, having a lamination stack 12 comprising a total of four partial stacks 14a-d with sheet metal laminations 16a-d. Sheet metal laminations 16a-d and partial stacks 14a-d are axially joined along a center axis A of the lamination stack 12 and of the electric machine. Each of the partial stacks 14a-d has a radially inner circumferential area 24a-d, a radially outer circumferential area 25a-d and a plurality of connection areas 18a-d for the connection of laminations 16a-d and for the connection of the individual partial stacks 14a-d, these connection areas 18a-d being distributed in circumferential direction. Connection areas 18a-d are brought into mutual register at the joined partial stacks 14a-d and accordingly form a plurality of common connection areas 18.

Figure 3:
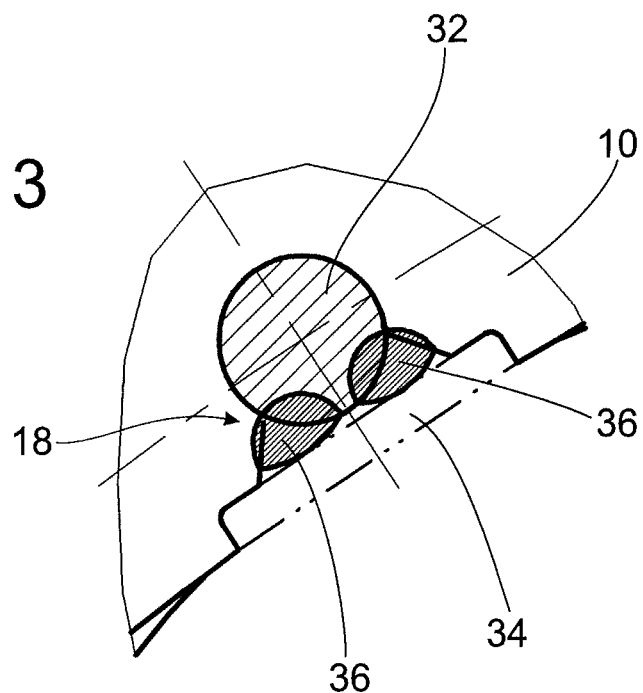
FIG. 3 is a sectional front view of the lamination stack from FIGS. 1, 2 in a connection area of the partial stacks.
Figure 4:
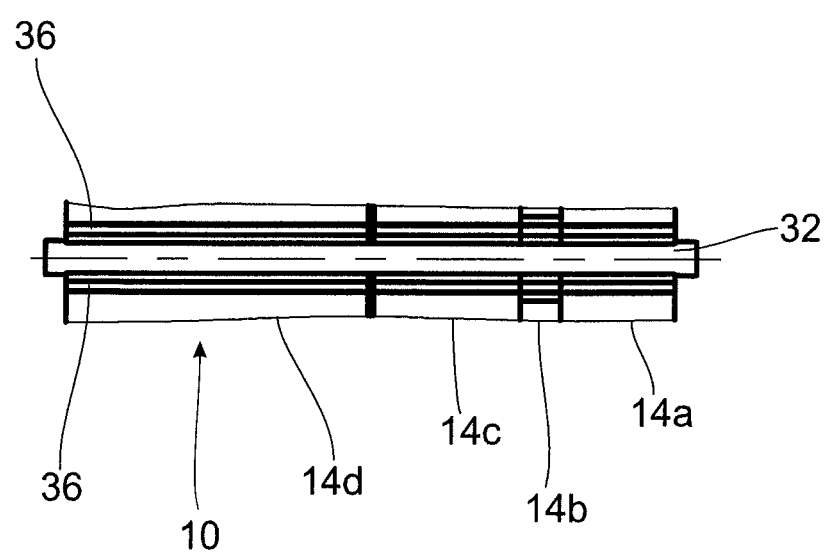
FIG. 4 is an axial partial view of the lamination stack with the connection area shown in FIG. 3.

In the present case, the connection areas 18 each have a cutout 181a-d that extends axially inside the sheet metal laminations 16a-d and in which a profile bar 32 that extends axially over all of the partial stacks 14a-d and is made of a weldable material, in the present case a steel designated as 1.0122, is inserted and is welded to the sheet metal laminations 16a-d by two axially extending welds 36 (FIGS. 3, 4). In order to install the profile bars 32 in a captive manner prior to welding, projections 42 can be formed at the cutouts 181a-d as is shown in FIGS. 7, 8, and the profile bars 32 can be pressed in or clamped in by these projections 42. In FIG. 7, two projections 42 are provided by plastic deformation of the edge areas of a cutout 181, while projections 42 in FIG. 8 are already provided at the lamination cut as noses projecting into the cutout 181.

An axially extending free space 34, which can receive the weld seams 36 and the article to be welded, is formed in radial direction between the profile bar 32 and the nearest circumferential area 24 of the lamination stack 12. The free space 34 can also, or additionally, form a cooling channel at the rotor 10 for guiding a cooling fluid. Additional connection areas are formed as stacking dimples 38 as is shown in FIGS. 5 and 6.

Further, in the embodiment example under consideration only one of the partial stacks 14a-d, in this case partial stack 14b, comprises a plurality of fastening areas 20b on a pitch circle for arranging the lamination stack 12 at a carrier element, not shown here. The fastening areas 20b are arranged in circumferential direction between the connection areas 18 and symmetrically with respect to the latter in each instance. To form the individual fastening areas 20b, circumferential area 24b is formed relative to the circumferential areas 24a, c of the lamination stacks 14a, c axially adjacent to it as a radially inward-facing lug and, accordingly, so as to be radially offset. The fastening areas 20b can be constructed in accordance with specific requirements. In the example, recesses or openings are provided in order to fasten a carrier element by rivets, screw bolts, or the like radially, axially, and circumferentially. It can be seen in FIG. 2 that connection areas 18 and fastening areas 20b are arranged so as to be offset relative to one another by 45° at the circumference.

Further, the lamination stack 12 has a magnetic interaction area 22 for cooperating with a stator, not shown, of the electric machine. The interaction area 22 is formed by one of the circumferential areas 25a-d of the partial stacks 14a-d, particularly by the outer circumferential areas 25a-d. As can be seen from the figures, rotor 10 in the present instance comprises for this purpose a plurality of rotor poles 26 with permanent magnets 28, these rotor poles 26 being uniformly distributed along the circumference. The magnetic interaction area 22 is accordingly formed at the circumferential areas 24a-d remote of the connection areas 18a-d and also remote of the fastening area 20b.

It can be further appreciated from the figures that pockets 30 for receiving the permanent magnets 28 are formed at the radially outer circumferential areas 25a-d of partial stacks 14a-d. Each rotor pole 26 is formed of two permanent magnets 28a, 28b which are adjacent in circumferential direction, are oriented in a V-shape relative to one another and are arranged in the present instance in separate, circumferentially closed pockets 30a, 30b. The pockets 30 of two adjacent rotor poles, which pockets 30 are adjacent in circumferential direction, are separated at the lamination stack 12 by a cutout or by a gap 40.

In the above-mentioned embodiment example, the rotor 10 has a total of 16 rotor poles with a total of 32 permanent magnets 28. Further, the sum of the quantity of connection areas 18b and the quantity of fastening areas 20b corresponds exactly to the quantity of rotor poles 26 at partial stack 14b.

Figure 2:
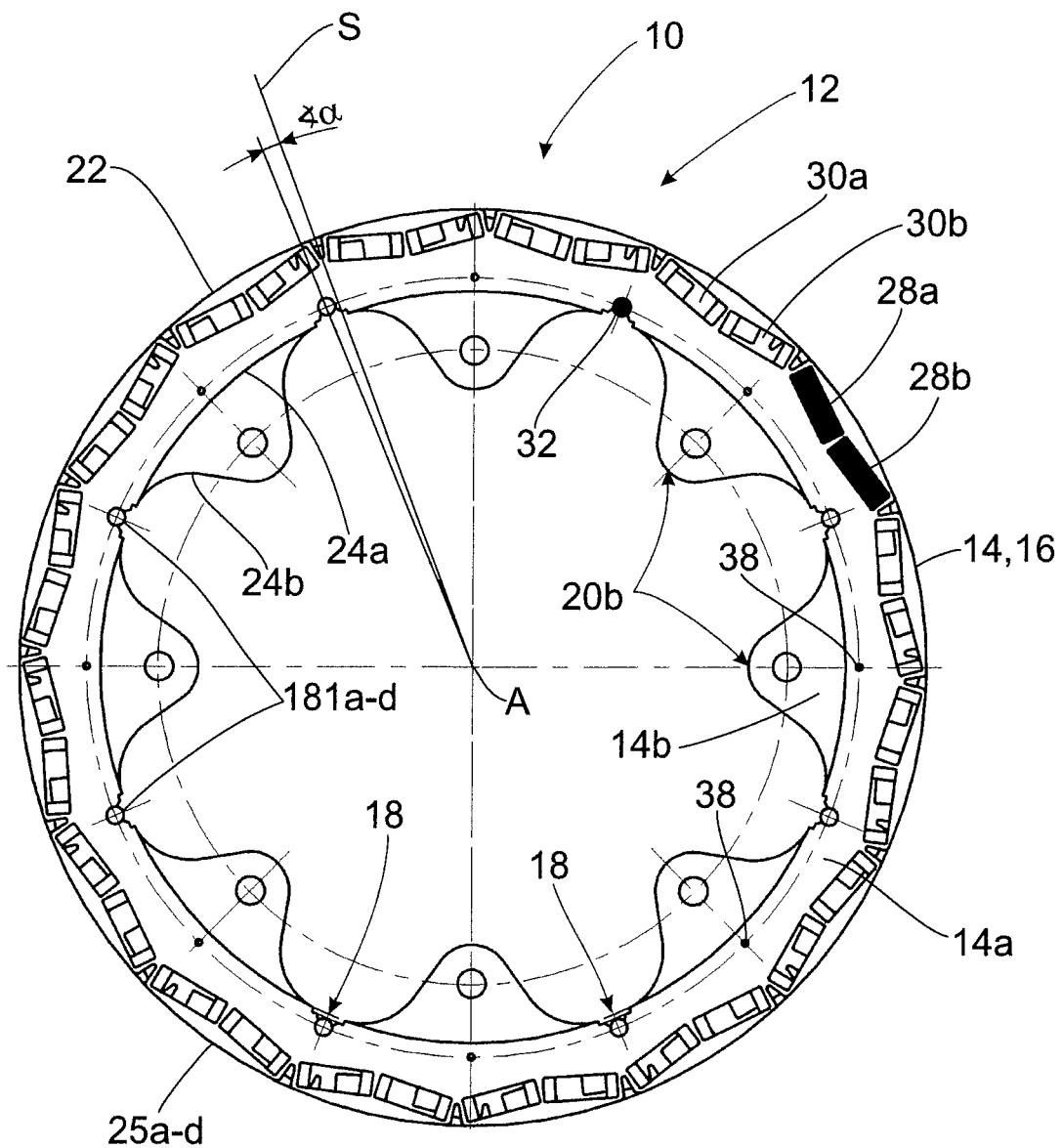
FIG. 2 is a top view of the rotor from FIG. 1.

As is clearly shown in FIGS. 2 and 6, the connection areas 18 are arranged asymmetrically with respect to rotor poles 26. In a lateral plane of the lamination stack 12, connection areas 18 include an angle α relative to a symmetry plane S of rotor poles 26. Further, partial stacks 14c, d are joined together in a mirror-inverted manner in order to reduce a magnetic cogging torque acting between the rotor 10 and a stator so that the rotor poles 26 of these partial stacks 14c,

*d* are arranged so as to be offset relative to one another in circumferential direction by angle 2×α.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A rotor of an electric machine having:
a lamination stack, comprising:
a first partial stack with first sheet metal laminations; and
a second partial stack with second sheet metal laminations,
wherein the sheet metal laminations and partial stacks are joined axially along a center axis of the lamination stack, and
wherein each of the partial stacks has a radially inner circumferential area and a radially outer circumferential area,
wherein each of the partial stacks has a plurality of connection areas distributed in circumferential direction that are in mutual register at the joined partial stacks and form a common connection area,
wherein at least one of the partial stacks has a fastening area for arranging the lamination stack at a carrier element,
wherein a circumferential area is formed so as to be radially offset to an axially adjacent circumferential area in order to form the fastening area,
wherein the lamination stack has a magnetic interaction area formed by at least one of the radially outer circumferential areas of the partial stacks for cooperation with a stator of an electric machine, the magnetic interaction area comprises: a plurality of rotor poles with permanent magnets that are uniformly distributed along the circumference.

2. The rotor according to claim 1, wherein the partial stack has pockets configured to receive the permanent magnets in the magnetic interaction area, wherein each rotor pole comprises two permanent magnets that are adjacent in circumferential direction and which are arranged together or separately in the pockets.

3. The rotor according to claim 1, wherein a plurality of fastening areas, which are arranged in circumferential direction between the connection areas are formed at a partial stack.

4. The rotor according to claim 1, wherein a sum of a quantity of connection areas and a quantity of fastening areas at a partial stack corresponds to a specific quantity of rotor poles.

5. The rotor according to claim 1, wherein the connection areas are arranged at a partial stack asymmetrically with respect to the rotor poles, and the connection areas include an angle α relative to a symmetry plane of the rotor poles in a lateral plane of the lamination stack.

6. The rotor according to claim 5, wherein the rotor poles of two axially adjacent partial stacks are offset relative to one another in circumferential direction by angle 2×α.

7. The rotor according to claim 1, wherein a connection area has a cutout that extends axially within the sheet metal laminations and in which a profile bar extending axially over both partial stacks is inserted and is welded to the sheet metal laminations.

8. The rotor according to claim 7, wherein an axially extending free space is formed radially between the profile bar and a nearest circumferential area of the lamination stack.

9. The rotor according to claim 3, wherein a plurality of fastening areas, are symmetrically with respect to the connection areas.

* * * * *